United States Patent [19]

Dewolf et al.

[11] Patent Number: 5,255,250
[45] Date of Patent: Oct. 19, 1993

[54] COMBINATION OF A SIGNAL SOURCE AND A RECORDING DEVICE FOR RECORDING N PIECES OF MUSIC GENERATED BY THE SIGNAL SOURCE ON A MAGNETIC RECORD CARRIER, A SIGNAL SOURCE AND A RECORDING DEVICE TO BE USED IN THE COMBINATION

[75] Inventors: Jan Dewolf; Gerardus Lokhoff, both of Eindhoven, Netherlands

[73] Assignee: U.S. Philips Corporation, New York, N.Y.

[21] Appl. No.: 772,987

[22] Filed: Oct. 7, 1991

[30] Foreign Application Priority Data

Oct. 24, 1990 [NL] Netherlands ............................ 9002319
Feb. 5, 1991 [NL] Netherlands ............................ 9100198

[51] Int. Cl.$^5$ ............................................. G11B 19/00
[52] U.S. Cl. ....................................... 369/32; 369/83; 369/84; 369/14; 360/13; 360/15
[58] Field of Search ................... 369/14, 15, 18, 32, 369/83, 84; 360/13, 15, 71, 40, 48

[56] References Cited

U.S. PATENT DOCUMENTS

4,916,681  4/1990  Takamatsu .......................... 369/14
5,117,313  5/1992  Lokhoff et al. ..................... 360/40

FOREIGN PATENT DOCUMENTS

276143  7/1988  European Pat. Off. .
374921  6/1990  European Pat. Off. .

*Primary Examiner*—Robert J. Pascal
*Assistant Examiner*—R. A. Ratliff
*Attorney, Agent, or Firm*—Edward W. Goodman

[57] ABSTRACT

When recording n pieces of music on a magnetic record carrier (3), two groups of pieces of music are formed. A first group of $g_1$ pieces of music is recorded on the A-side of the record carrier and a second group of $g_2$ (=n−$g_1$) pieces of music is recorded on the B-side. The groups are selected such that the total time duration of each of the two groups $T_{tot}(g_1)$, $T_{tot}(g_2)$ is nearest to half the total time duration of all the n pieces of music ($T_{tot}/2$).

24 Claims, 2 Drawing Sheets

COMBINATION OF A SIGNAL SOURCE AND A RECORDING DEVICE FOR RECORDING N PIECES OF MUSIC GENERATED BY THE SIGNAL SOURCE ON A MAGNETIC RECORD CARRIER, A SIGNAL SOURCE AND A RECORDING DEVICE TO BE USED IN THE COMBINATION

BACKGROUND OF THE INVENTION

1. Field of the Invention

The invention relates to a combination of a signal source for generating a number of n successive pieces of music and a device for recording the n pieces of music on an A-side and a B-side of a magnetic record carrier, each of the n pieces of music having a time duration of T(i) and the total time duration of the n pieces of music being shorter than the total play time of the A and B-sides of the record carrier, the signal source furthermore being arranged for generating time information related to the time duration of each of the n pieces of music, the combination comprising:

a memory for storing the time information, computing means for deriving from the time information a first group of $g_1$ pieces of music of the n pieces of music to be recorded on the A-side, and a second group of $g_2$ pieces of music to be recorded on the B-side, where $g_1 + g_2$ is equal to n, and the computing means further being arranged for generating control signals and for supplying the control signals to the recording device and, in addition, the recording device being arranged for recording the group of $g_1$ pieces of music on the A-side of the record carrier and the group of $g_2$ pieces of music on the B-side of the record carrier in response to these control signals, and in which the computing means is arranged for establishing the total time duration $T_{tot}$ of the n pieces of music, and is arranged for establishing the first group of $g_1$ pieces of music and the second group of $g_2$ pieces of music in such a way that the time duration of the first group of $g_1$ pieces of music and that of the second group of $g_2$ pieces of music is nearest to half the total time duration of the n pieces of music.

The invention likewise relates to a signal source and a recording device to be used in the combination.

A combination of the type mentioned in the preamble is known from U.S. Pat. No. 4,916,681. In this combination the n pieces of music are intended to be grouped in such a way that they are distributed over the two sides of the record carrier in the best way possible.

SUMMARY OF THE INVENTION

It is an object of the invention to provide a combination of a signal source and a recording device for obtaining record carriers on which the pieces of music are recorded differently.

Therefore, the combination according to the invention is characterized in that the signal source is an arrangement for reproducing the n pieces of music from a second record carrier, for example, an optical record carrier, on which the n pieces of music are recorded in a specific order, in that the reproduction device is arranged for reproducing the n pieces of music in a specific order in response to a sequence control signal, in that the computing means is arranged for establishing a first group of $g_1$ not necessarily successive pieces of music of the n pieces of music on the second record carrier, and a second group of $g_2$ not necessarily successive pieces of music of the n pieces of music on the second record carrier, and is arranged for generating a sequence control signal in accordance with the groups of $g_1$ and $g_2$ respectively, pieces of music, and in that the reproduction device is arranged for reproducing first the first group of $g_1$ pieces of music from the record carrier and then the second group of $g_2$ pieces of music from the record carrier in response to the sequence control signal.

The invention is based on the understanding that it is possible to shorten the (sometimes long) search times which are necessary for changing from reproducing a specific piece of music to reproducing a next piece of music.

Therefore, according to the invention, the order of the pieces of music to be recorded is changed before the recording of the record carrier is initiated. Thus, the two groups may be selected more advantageously, so that the total time durations of the two groups can come closer together so as to shorten the search times of pieces of music to be reproduced successively. One group is then recorded on one side (side A), whereas the other group is recorded on the other side (side B) of the record carrier. The two groups of pieces of music are recorded on both sides of the record carrier in such a way that, seen in longitudinal direction of the record carrier, they largely overlap each other. Consequently, start and end positions of the pieces of music are closer together on average so that the search times can be shorter.

One option is that the recording device is arranged for recording the first group of $g_1$ pieces of music on side A of the record carrier and the second group of $g_2$ pieces of music on side B of the record carrier in such a way that, seen in longitudinal direction of the record carrier, the location of the end of the first group of recorded pieces of music on side A is approximately equal to the location of the beginning of the second group of recorded pieces of music on side B of the record carrier.

Another option is that the recording device is arranged for recording the first group of $g_1$ pieces of music on side A of the record carrier and the second group of $g_2$ pieces of music on side B of the record carrier in such a way that, seen in longitudinal direction of the record carrier, the location of the beginning of the first group of recorded pieces of music on side A is approximately equal to the location of the end of the second group of pieces of music recorded on the record carrier.

This achieves that the initial positions of pieces of music are even closer together on average, so that the search time for a next piece of music to be reproduced can even be shorter.

The combination may further be characterized in that the computing means is arranged for establishing the first group of $g_1$ pieces of music as well as the second group of $g_2$ pieces of music, so that, seen in longitudinal direction of the record carrier, the locations of the transitions between the pieces of music of the first group correspond in the best possible way to the locations of the transitions between the pieces of music of the second group. This may produce an even further reduction of the search times.

BRIEF DESCRIPTION OF THE DRAWINGS

The invention will be further explained in the following with reference to a number of exemplary embodiments, in which.

DESCRIPTION OF THE PREFERRED EMBODIMENTS

Figure 1:
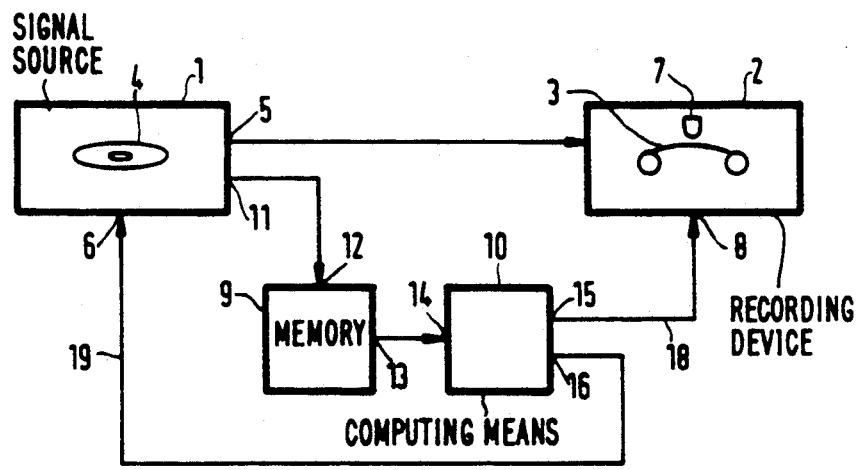
FIG. 1 shows the combination of the invention.

FIG. 1 shows, in a diagram, a combination of a signal source 1 for generating a number of n successive pieces of music and a device 2 for recording the n pieces of music on an A-side and a B-side of a magnetic record carrier 3. The signal source 1 may, for example, be a reproduction device for reproducing the n pieces of music from a record carrier, for example, an optical record carrier 4, such as a compact disc. The signal source 1 is then a compact disc digital audio player. On the compact disc 4, the n pieces of music are recorded in a specific order. By switching the player 1 to reproduction, these n pieces of music are reproduced and applied to an output 5 in the same order. In response to a sequence control signal which can be applied from the exterior, for example, by operating the appropriate program buttons (not shown) on the player 1, or by applying the sequence control signal to the player through a control signal input 6, the order in which the pieces of music are reproduced can be chosen different from the order in which the pieces of music have been recorded on the carrier 4. In that case the n pieces of music appear at output 5 in a different order in accordance with the sequence control signal.

The device 2 may be a stereo cassette recorder in which the pieces of music can be recorded as a stereo signal on the (two) stereo tracks of the A and B-sides by means of a write head 7. The device 2 is of the auto-reverse type. This means that when the end of the tape is detected, for example of the A-side, the direction of transport of the tape is reversed subsequent to which a change is made to recording a signal on or reproducing a signal from the other side, that is to say, in this case the B-side.

This change can also be realized in response to a reverse control signal applied to the device 2 from the exterior through a control signal input 8. The device 2 can also be a recording device for recording a digital signal on an A-side and a B-side of a magnetic record carrier. In this connection a SDAT recorder as is described in the book entitled "The Art of Digital Audio" by J. Watkinson, Focal Press 1988, Chapter 9, more specifically, Chapter 9.20 may be considered. Another option is the digital cassette recorder as is described in Dutch Patent Application No. 90.00.039 corresponding to U.S. Pat. No. 5,117,313 (PHN 13.209).

The combination further includes a memory 9 and computing means 10. The signal source 1 is further arranged for producing time information indicating the time duration $T(i)$ of each of the n pieces of music $MP(i)$, or time information from which the time duration $T(i)$ of each of the n pieces of music $MP(i)$ can be derived.

In the example of the CD player, the compact disc 4 contains, in a lead-in track, information indicating the initial addresses of all pieces of music in the form of an absolute time indication. From this information the time duration of each of the n pieces of music can be derived.

The time information, or the derived time durations already derived therefrom, is produced at an output 11 and applied to an input 12 of memory 9. In the memory 9 the time durations are first derived from the time information, if so required, and stored. The time durations $T(i)$ are applied to an input 14 of the computing means 10 through an output 13. The computing means 10 derives the total time duration of n pieces of music by summing the time durations $T(i)$ to $T(n)$. Then, the computing means establishes two groups of pieces of music from the n pieces of music, that is to say, a first group of $g_1$ pieces of music and a second group of $g_2$ ($=n-g_1$) pieces of music. The two groups each have a total time duration, so that these time durations are the nearest approximates to half the total time duration of the n pieces of music. Then, at an output 15, the computing means generates a control signal to be applied to the recording device 2 and at an output 16 a control signal to be applied to the signal source 1. In response to the control signal at the output 16, the signal source 1 generates at its output 5 first the first group of $g_1$ pieces of music and then the second group of $g_2$ pieces of music.

In response to the control signal at output 15, the recording device 2 commences to record the first group of pieces of music on the A-side of the record carrier 3 after which the direction of transport of the record carrier is reversed and the second group of $g_2$ pieces of music is recorded on the B-side of the record carrier.

This method will be explained with reference to FIG. 2.

Figure 2A:
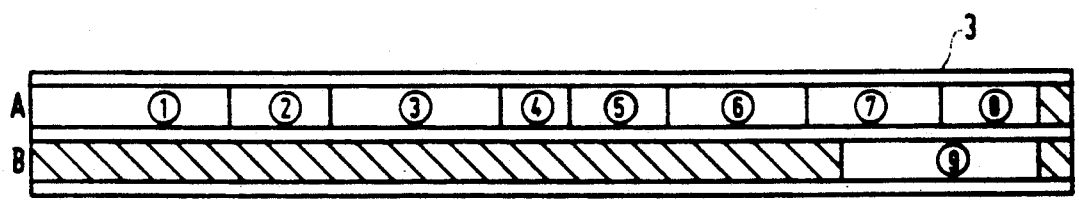
FIGS. 2a and 2b show known manners for recording pieces of music on the record carrier, and in FIG. 2c shows a manner of recording in accordance with the invention.

FIG. 2a shows a record carrier 3 as described in a combination known from European patent application No. 276,143. FIG. 2 shows, merely schematically, the A and B-sides in that only a single track is represented for each side. For the standard audio cassette on which a stereo signal is recorded on each side, there are two tracks on each side. If a SDAT cassette is concerned, each side comprises twenty tracks for recording the digital audio signal and an auxiliary track. A DCC cassette comprises on each side eight tracks for recording the digital audio signal and an auxiliary track. In both cases the auxiliary tracks are intended for recording the sub-code information. For example, time information, date information, program numbers (pieces of music), addresses of pieces of music on the record carrier, text and graphical information if possible are concerned here.

In the example represented in FIG. 2a, nine pieces of music had to be recorded on the record carrier. The program numbers of the pieces of music will be shown hereinafter with the time durations of the pieces of music stated in minutes behind them in brackets: 1(6), 2(3), 3(5), 4(2), 5(3), 6(4), 7(4), 8(2) and 9(5).

The above order of the pieces of music is the order in which the pieces of music have been recorded on the compact disc. Since the total play time of the nine pieces of music is equal to 34 minutes, a one-hour cassette (thirty minutes on each side) is to be used.

It is an object of the combination known from the European patent application to have as many pieces of music on one side of the record carrier 3 as possible. This results in recording the numbers on both sides as is represented in FIG. 2a. Side A is practically completely filled with music, whereas only the ninth and last piece of music is recorded on side B. The hatched area indicates the blank portions of the tape. As appears from FIG. 2a side A is not fully filled. At the end there is a 1-minute long unrecorded area. If the prior-art combination were capable of selecting a different order in which the numbers on the compact disc are reproduced, the sixth piece of music could have been reproduced last, thus after the ninth piece of music. In that case the ninth piece of music could still be recorded on side A so that side A would be filled completely. The sixth piece of music would then be recorded on side B.

The recording as represented in FIG. 2a is disadvantageous in that sometimes long searches are necessary for playing a next piece of music. If the device 2 is in the reproduction mode in which piece of music number 1 is reproduced and if the seventh or ninth piece of music is to be read out, the device will change over to fast forward until the beginning of the seventh or ninth piece of music is detected, after which the device can change back to reproduction. Since the two pieces of music are situated practically at the other end of the record carrier 3, there will be a long pause between the reproduction of the first piece of music and the next piece of music (seventh or ninth).

Figure 2B:
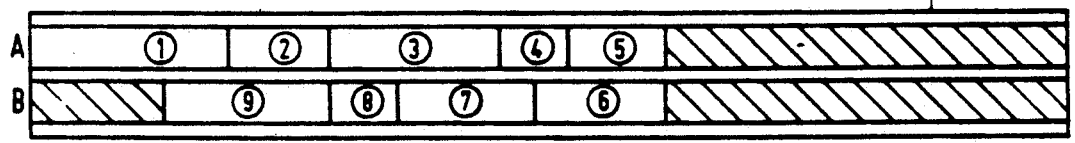

FIG. 2b shows the order in which the pieces of music are recorded on the record carrier by the combination known from U.S. Pat. No. 4,916,681.

The computing means 10 establishes that the total play time of the nine pieces of music is 34 minutes. Half of this is 17 minutes. Then, the computing means establishes that the total play time of the first five pieces of music is 19 minutes. The total play time of the remaining pieces of music is 15 minutes.

The computing means 10 generates control signals at the outputs 15 and 16 in response to which the signal source commences to reproduce the first group of five pieces of music, whereas the device 2 is switched to recording so that these five pieces of music are recorded on the A-side of the record carrier. In response to a second control signal from, for example, the computing means 10, which signal occurs once the five first pieces of music have been recorded on the A-side, the direction of transport of the record carrier 3 is reversed, so that the second group of the remaining four pieces of music is subsequently recorded on the B-side of the record carrier, compare FIG. 2b. In this case the end of the recording of the first group, seen in longitudinal direction of the record carrier, has the same position as the beginning of the recording of the second group.

FIG. 2b distinctly shows that the search times are now much shorter because the transport time necessary for transporting the record carrier 3 to the beginning of a piece of music to be reproduced next is much shorter.

Figure 2C:
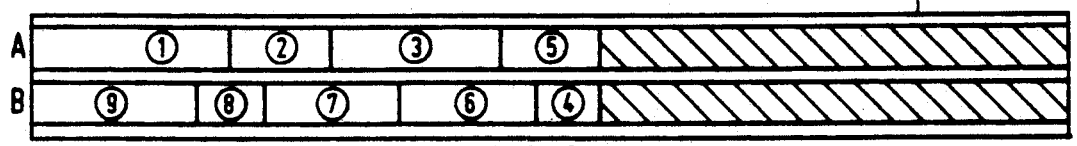

FIG. 2c shows how the combination according to the invention can record the pieces of music on the A- and B-sides of the record carrier. It is thereby assumed that the order in which the nine pieces of music of the compact disc 4 are reproduced can be changed. The computing means 10 again establishes a first and a second group of pieces of music. They are: a first group of the pieces of music numbered 1, 2, 3 and 5 and a second group of the pieces of music numbered 4, 6, 7, 8 and 9. The two groups have each a total time duration of 17 minutes. The computing means 10 generates a sequence control signal for the signal source 1 through the output 16 so that the signal source 1 reproduces the nine pieces of music in the order laid down by the computing means 10. FIG. 2c shows how the nine pieces of music have been recorded on the record carrier 3.

Needless to observe that in the combination of FIG. 1, more electrical connections are necessary than represented in the Figure, for having the combination operate as it should do. The computing means 10 is to know, for example, when the reproduction of the first group of pieces of music has terminated so that it can give a switch signal to the device 2 for the direction of transport of the record carrier to be reversed. Actually, a control signal link from the signal source 1 to the computing means 10 is necessary for this purpose. Such a signal link is not shown to avoid the description of the invention being concentrated on too many side matters not directly relating to the invention itself. In addition, without any further inventiveness, it is possible for the expert to realize an operational combination based on above description.

In the foregoing the time durations for the nine pieces of music were selected so that groups of $g_1$ or $g_2$ pieces of music could be assembled having exactly the same total time durations, cf. FIG. 2c. Alternatively, it is possible that the two groups of pieces of music are obtained not having exactly the same total time durations. In that case, the location of the end of the recording of the first group of $g_1$ pieces of music on the A-side, seen in longitudinal direction of the record carrier, could be permitted coinciding with the beginning of the recording of the second group of $g_2$ pieces of music on the B-side, as is represented in FIG. 2b.

However, it would be possible to permit the location of the beginning of the recording of the first group of $g_1$ pieces of music on the A-side coinciding with the end of the recording of the second group of $g_2$ pieces of music on the B-side. This means that at the end of the recording of the first group of pieces of music the direction of transport of the record carrier is reversed and rewinding is to take place before the second group of pieces of music can be recorded. In addition, this means that the computing means, after the first group of five pieces of music has been recorded, is to apply a pause signal to the signal source 1, so that the recording is interrupted until the moment at which the device 2 has assumed the position in which the recording is to be commenced on the B-side.

Locating the correct position on side B where the recording of the second group of pieces of music is to be commenced, is a method known per se. For this purpose, the device 2 comprises detection means, for example, in the form of a tachogenerator comprising a counter that indicates the position of the write head 7 relative to the track on the record carrier, seen in longitudinal direction of the track. This position corresponds to the time necessary for reaching this position during the recording of the first group of pieces of music. Since the difference in total time duration of the two groups of pieces of music is known, the position at which recording is to be commenced on the B-side can be computed.

Figure 3:
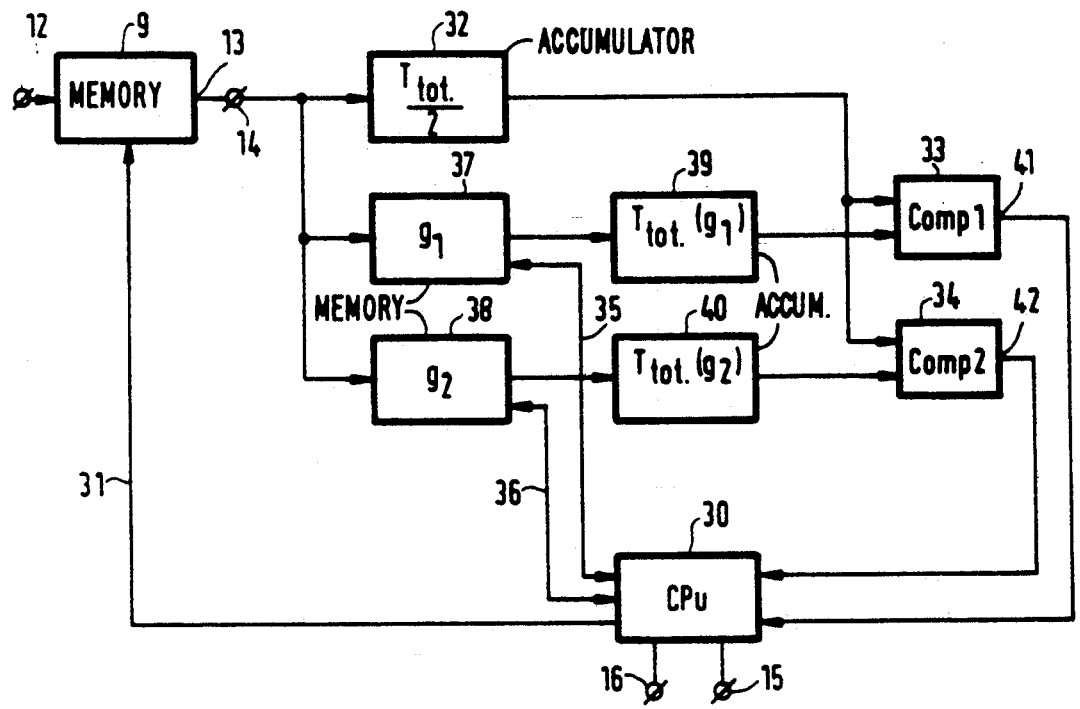
FIG. 3 shows a further embodiment of the computing means.

FIG. 3 shows a further embodiment of the memory 9 and the computing means 10. In response to a control signal supplied to the memory 9 through line 31 by the central processor 30 belonging to the computing means, the time durations of the n pieces of music are applied to an accumulator 32 that adds together the time durations of all n pieces of music so as to obtain the total time duration $T_{tot}$ and subsequently divides this time duration by two. The value for $T_{tot}/2$ is applied to comparators 33 and 34.

In response to control signals applied to the memories 9, 37 and 38 through the lines 31, 35 and 36, first and second groups $g_1$ and $g_2$ (=n-$g_1$) respectively, of program numbers of pieces of music are formed of which the time durations of the pieces of music in these groups are added together in the accumulators 39 and 40 to obtain total time durations $T_{tot}(g_1)$ and $T_{tot}(g_2)$, respectively, of the two groups of pieces of music. These time durations are fed to the respective comparators 33 and 34. A comparator 33 (34) generates a control signal at an output 41 (42) in accordance with the different time durations $T_{tot}/2$-$T_{tot}(g_1)$ and $T_{tot}/2$ $T_{tot}(g_2)$, respectively. These control signals are applied to the central processor 30. In response to these control signals, the central processor 30 produces control signals on the lines 31, 35 and 36 until the requirement is fulfilled that both $T_{tot}(g_1)$ and $T_{tot}(g_2)$ are nearest to $T_{tot}/2$. This is realized by exchanging pieces of music between the two groups while considering the smallest difference values. The groups $g_1$ and $g_2$ then stored in the memories 37 and 38 are applied to the central processor 30 over the lines 35 and 36 so that the central processor 30 is capable of generating the proper control signals at the outputs 15 and 16.

For a further explanation of this procedure of exchanging pieces of music between the first and second groups of pieces of music, reference be made to, for example, European Patent Application No. 374.921.

Figure 4:
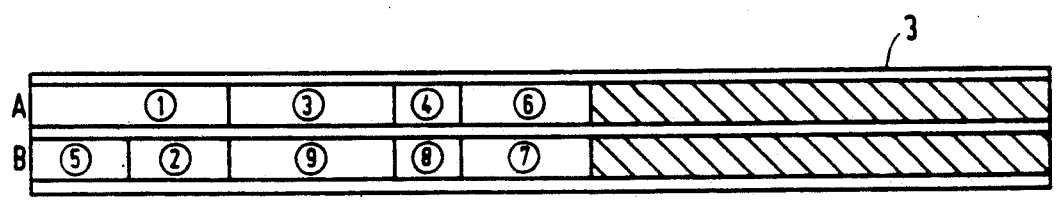
FIG. 4 shows a different manner of recording in accordance with the invention.

FIG. 4 shows yet a different order in which the pieces of music are recorded on both sides of the record carrier 3. The order is chosen in such a way that a maximum number of transitions between the pieces of music on the A-side, seen in longitudinal direction of the record carrier, correspond to the transitions between the pieces of music on the B-side.

The great advantage of this measure is that an even shorter search time is possible now. It will be clear that if the reproduction head in a random play mode reaches the end of one of the numbers 1, 3, 4 or 6 of the A-side, a switch can immediately be made to the reproduction of the respective numbers 2, 9, 8 and 7 by a mere auto-reverse action of the reproduction device.

The combination of FIG. 1 can be accommodated in two housings in such a way that the signal source 1, the memory 9 and the computing means 10 are located in one housing, for example, that of the compact disc player. In that case there is a control signal line 18 leading from the compact disc player to the recording device 2 for controlling this device with respect to transport speed and direction of transport and for switching the recording mode on and off for the A or B-side.

In lieu of being accommodated in the compact disc player, the computing means 10 and possibly also the memory 9 can be accommodated in the recording device. In that case a control signal line 19 from the recording device to the signal source 1 is necessary for actuating this signal source 1, for switching the device into the reproduction mode and for selecting the order in which the pieces of music are reproduced. The outputs 5 and 11 could be combined so that both the time information and audio information can be transmitted from the signal source to device 2 and memory 9 through the same output.

We claim:

1. Combination of a signal source for generating a number of n successive pieces of music and a device for recording the n pieces of music on an A-side and a B-side of a magnetic record carrier, each of the n pieces of music having a time duration of T(i) and the total time duration of the n pieces of music being shorter than the total play time of the A and B-sides of the record carrier, the signal source furthermore being arranged for generating time information related to the time duration of each of the n pieces of music, the combination comprising:

a memory for storing the time information,
computing means for deriving from the time information a first group of $g_1$ pieces of music of the n pieces of music to be recorded on the A-side, and a second group of $g_2$ pieces of music to be recorded on the B-side, where $g_1+g_2$ is equal to n, and the computing means further being arranged for generating control signals and for supplying the control signals to the recording device and, in addition, the recording device being arranged for recording the group of $g_1$ pieces of music on the A-side of the record carrier and the group of $g_2$ pieces of music on the B-side of the record carrier in response to these control signals, and in which the computing means is arranged for establishing the total time duration $T_{tot}$ of the n pieces of music, and is arranged for establishing the first group of $g_1$ pieces of music and the second group of $g_2$ pieces of music in such a way that the total time duration of the first group of $g_1$ pieces of music and the second group of $g_2$ pieces of music are nearest to half the total time duration of the n pieces of music,
characterized in that the signal source is an arrangement for reproducing the n pieces of music from a second record carrier, for example, an optical record carrier, on which the n pieces of music are recorded in a specific order, in that the reproduction device is arranged for reproducing the n pieces of music in a specific order in response to a sequence control signal, in that the computing means is arranged for establishing a first group of $g_1$ not necessarily successive pieces of music of the n pieces of music on the second record carrier and of a second group of $g_2$ not necessarily successive pieces of music of the n pieces of music on the second record carrier, and is arranged for generating a sequence control signal in accordance with the groups of $g_1$ and $g_2$ respectively, pieces of music, and in that the reproduction device is arranged for reproducing first the first group of $g_1$ pieces of music from the record carrier and then the second group of $g_2$ pieces of music from the record carrier in response to the sequence control signal.

2. Combination as claimed in claim 1, characterized in that the recording device is arranged for recording the first group of $g_1$ pieces of music on side A of the record carrier and the second group of $g_2$ pieces of music on side B of the record carrier in a manner such that, seen in longitudinal direction of the record carrier, the location of the end of the first group of recorded pieces of music on the A-side is about equal to the location of the beginning of the second group of recorded pieces of music on the B-side of the record carrier.

3. Combination as claimed in claim 1, characterized in that the recording device is arranged for recording the first group of $g_1$ pieces of music on side A of the record carrier and the second group of $g_2$ pieces of music on side B of the record carrier, in a manner such that, seen in longitudinal direction of the record carrier, the location of the beginning of the first group of recorded pieces of music on side A is about equal to the location of the end of the second group of recorded pieces of music on side B of the record carrier.

4. Combination as claimed in claim 1, characterized in that the computing means is arranged for establishing the first group of $g_1$ pieces of music and the second group of $g_2$ pieces of music, so that, seen in longitudinal direction of the record carrier, the locations of the transitions between the pieces of music of the first group correspond in the best possible way to the locations of the transitions between the pieces of music of the second group.

5. Signal source to be used in the combination as claimed in claim 1, characterized in that the computing means is incorporated in the signal source.

6. Recording device to be used in the combination as claimed in claim 1, characterized in that the computing means is incorporated in the recording device.

7. Combination as claimed in claim 2, characterized in that the computing means is arranged for establishing the first group of $g_1$ pieces of music and the second group of $g_2$ pieces of music, so that, seen in longitudinal direction of the record carrier, the locations of the transitions between the pieces of music of the first group correspond in the best possible way to the location of the transitions between the pieces of music of the second group.

8. Combination as claimed in claim 3, characterized in that the computing means is arranged for establishing the first group of $g_1$ pieces of music and the second group of $g_2$ pieces of music, so that, seen in longitudinal direction of the record carrier, the locations of the transitions between the pieces of music of the first group correspond in the best possible way to the location of the transitions between the pieces of music of the second group.

9. Signal source to be used in the combination as claimed in claim 2, characterized in that the computing means is incorporated in the signal source.

10. Signal source to be used in the combination as claimed in claim 3, characterized in that the computing means is incorporated in the signal source.

11. Signal source to be used in the combination as claimed in claim 4, characterized in that the computing means is incorporated in the signal source.

12. Signal source to be used in the combination as claimed in claim 7, characterized in that the computing means is incorporated in the signal source.

13. Signal source to be used in the combination as claimed in claim 8, characterized in that the computing means is incorporated in the signal source.

14. Recording device to be used in the combination as claimed in claim 2, characterized in that the computing means is incorporated in the recording device.

15. Recording device to be used in the combination as claimed in claim 3, characterized in that the computing means is incorporated in the recording device.

16. Recording device to be used in the combination as claimed in claim 5, characterized in that the computing means is incorporated in the recording device.

17. Recording device to be used in the combination as claimed in claim 5, characterized in that the computing means is incorporated in the recording device.

18. Recording device to be used in the combination as claimed in claim 7, characterized in that the computing means is incorporated in the recording device.

19. Recording device to be used in the combination as claimed in claim 8, characterized in that the computing means is incorporated in the recording device.

20. Recording device to be used in the combination as claimed in claim 9, characterized in that the computing means is incorporated in the recording device.

21. Recording device to be used in the combination as claimed in claim 10, characterized in that the computing means is incorporated in the recording device.

22. Recording device to be used in the combination as claimed in claim 11, characterized in that the computing means is incorporated in the recording device.

23. Recording device to be used in the combination as claimed in claim 12, characterized in that the computing means is incorporated in the recording device.

24. Recording device to be used in the combination as claimed in claim 13, characterized in that the computing means is incorporated in the recording device.

* * * * *